(12) United States Patent
Ebert

(10) Patent No.: US 9,422,473 B2
(45) Date of Patent: Aug. 23, 2016

(54) LUMINESCENT COMPOSITION

(75) Inventor: Dieter Ebert, Icking (DE)

(73) Assignee: Swiss Authentication Research and Development AG, Tagerwilen (CH)

( * ) Notice: Subject to any disclaimer, the term of this patent is extended or adjusted under 35 U.S.C. 154(b) by 0 days.

(21) Appl. No.: 12/714,606

(22) Filed: Mar. 1, 2010

(65) Prior Publication Data
US 2010/0219377 A1 Sep. 2, 2010

Related U.S. Application Data

(63) Continuation of application No. 12/306,567, filed as application No. PCT/EP2007/005688 on Jun. 27, 2007.

(30) Foreign Application Priority Data

Jun. 27, 2006 (DE) .......................... 10 2006 029 505
Jul. 7, 2006 (DE) .......................... 10 2006 031 563

(51) Int. Cl.
C09K 11/84 (2006.01)
C09K 11/77 (2006.01)

(52) U.S. Cl.
CPC .................................. C09K 11/7771 (2013.01)

(58) Field of Classification Search
USPC .................................. 250/459.1; 252/301.4 S
See application file for complete search history.

(56) References Cited

U.S. PATENT DOCUMENTS

| | | | |
|---|---|---|---|
| 3,822,215 A | 7/1974 | Grodkiewicz et al. | |
| 3,904,546 A * | 9/1975 | Mattis et al. | 252/301.4 S |
| 3,948,798 A * | 4/1976 | Ferri et al. | 252/301.4 S |
| 5,674,698 A | 10/1997 | Zarling et al. | |
| 5,888,424 A * | 3/1999 | Ebnesajjad et al. | 252/301.5 |
| 6,200,628 B1 | 3/2001 | Rozumek et al. | |
| 6,524,786 B1 * | 2/2003 | Jessop | 435/4 |
| 6,686,074 B2 | 2/2004 | Muth et al. | |
| 6,802,992 B1 | 10/2004 | Wieczoreck et al. | |
| 2005/0136486 A1 * | 6/2005 | Haushalter | 435/7.2 |

FOREIGN PATENT DOCUMENTS

| | | |
|---|---|---|
| AU | 36065 | 5/1973 |
| EP | 0 491 406 A1 | 6/1992 |
| GB | 1 205 340 | 9/1970 |
| GB | 1206198 | 9/1970 |
| GB | 2258659 A * | 2/1993 |

(Continued)

OTHER PUBLICATIONS

Wang et al. Characterization and properties of a red and orange Y2O2S-based long afterglow phosphor, Materials Chemistry and Physics vol. 80, No. 1 (Apr. 2003), pp. 1-5.*

Hirai and Orikoshi: "Preparation of yttrium oxysulfide phosphor nanoparticles with infrared-to-green and -blue upconversion emission using an emulsion liquid membrane system", Journal of Colloid and Interface Science (2004), 273, pp. 470-477.

(Continued)

*Primary Examiner* — David Porta
*Assistant Examiner* — Shun Lee
(74) *Attorney, Agent, or Firm* — Rothwell, Figg, Ernst & Manbeck, P.C.

(57) ABSTRACT

The invention relates to a luminescent composition which is based on yttrium oxide sulfide and other oxide sulfides and to which at least one doping agent is added. The inventive composition has a characteristic emission spectrum and can optionally be used along with a reading system that is adjusted to the emission spectrum in order to mark substances or *substance mixtures.

6 Claims, 1 Drawing Sheet

(56) References Cited

FOREIGN PATENT DOCUMENTS

| JP | 08 041454 A | 2/1996 |
| RU | 2137612 C1 | 9/1999 |
| RU | 2199829 C2 | 2/2003 |
| WO | 00/60527 A1 | 10/2000 |

OTHER PUBLICATIONS

De et al.: "Effect of OH on the upconversion luminescent efficiency of $Y_2O_3$:$Yb^{3+}$., $Er^{3+}$ nanostructures", Solid State Communications Mar. 2006, 137, pp. 483-487.

* cited by examiner

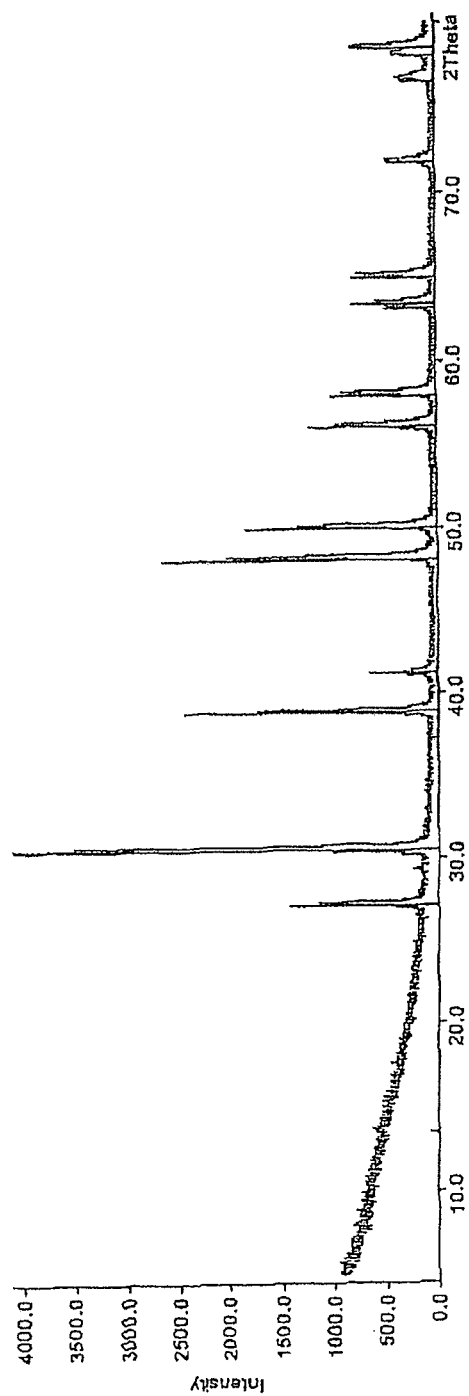

LUMINESCENT COMPOSITION

This application is a continuation of U.S. Ser. No. 12/306,567 filed Feb. 16, 2009, which is a 371 of International Application No. PCT/EP2007/005688, filed Jun. 27, 2007, both of which are incorporated by reference.

The invention relates to a luminescent composition which is based on yttrium oxide sulfide and further oxide sulfides and to which at least one dopant has been added. The composition has a characteristic emission spectrum and can, if appropriate together with a reading system matched to the emission spectrum, be used for marking materials or mixtures of materials.

Compounds containing lanthanide ions in the oxidation state +3 are often luminophors which on excitation with radiation in the infrared range emit shorter wavelength light, e.g. in the visible range and/or in the UV range. This property, referred to as "up conversion" or "anti-Stokes fluorescence", can be attributed to the electrons of the 4f shell of lanthanide ions being raised by sequential multiple excitation on irradiation to an energy level which has been increased by more than the energy corresponding to absorption of a single photon. A photon which has a higher energy than the originally absorbed photon can be emitted from this energy level on relaxation.

The use of lanthanide oxide sulfides as anti-Stokes luminophors is described, for example, in WO 00/60527 and in the U.S. Pat. Nos. 6,802,992 and 6,686,074. Furthermore, the use of these lanthanide oxide sulfides for marking materials or mixtures of materials is known.

According to the present invention, novel luminescent compositions which are based on the oxide sulfides of yttrium and at least three other elements and to which at least one dopant, preferably selected from among oxides and fluorides of main group and transition group elements, has been added are provided.

The present invention firstly provides a luminescent composition comprising
(a) an oxide sulfide of yttrium and oxide sulfides of at least three further elements selected from among lanthanum, cerium, praseodymium, neodymium, samarium, europium, gadolinium, terbium, dysprosium, holmium, erbium, thulium, ytterbium and lutetium and
(b) at least one dopant selected from among oxides and fluorides of main group and transition group elements.

The composition of the invention is a luminophor having "up converter" and/or "anti-Stokes" properties. It is preferably in crystalline form. Furthermore, it is preferred that the composition consists of a single phase, for example a crystalline phase, which can be established by X-ray diffraction methods. The composition is usually in the form of particles having an average particle size of ≥50 μm, in particular ≥1 nm. The particle size is preferably in the range 1 nm-100 μm, preferably 5 nm-50 μm and particularly preferably about 100 nm-10 μm.

Component (a) of the composition is formed by an oxide sulfide of yttrium and oxide sulfides of at least three further elements as indicated above. Yttrium and the further elements are usually present as trivalent cations, so that component (a) of the composition of the invention can preferably be represented as follows:

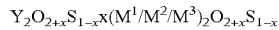
$$Y_2O_{2+x}S_{1-x}(M^1/M^2/M^3)_2O_{2+x}S_{1-x}$$

where $M_1$, $M_2$ and $M_3$ are trivalent cations of at least three of the abovementioned elements and X is a number in the range from 0 to 0.5, preferably from 0 to 0.2. Particular preference is given to X being 0.

In the total component (a), the yttrium oxide sulfide is preferably present in a proportion of ≥90 mol %, particularly preferably ≥92 mol %, even more preferably ≥94 mol % and most preferably ≥96 mol %. The further oxide sulfides are preferably present in a proportion of in each case up to 2 mol % based on the total component (a). The further oxide sulfides are preferably selected from among oxide sulfides of erbium, ytterbium and at least one further element, in particular lutetium, gadolinium, holmium, thulium, dysprosium and/or europium. The oxide sulfides of erbium and ytterbium are preferably present in a proportion of in each case 0.5-2 mol %, particularly preferably 1-2 mol %, based on the total component (a). The further oxide sulfides are preferably used in smaller proportions of, for example, 0.1-1 mol %, particularly preferably 0.1-0.5 mol %, based on the total component (a).

For example, the component (a) of the composition can contain oxide sulfides of 3, 4, 5, 6, 7 or even more further elements in addition to the oxide sulfide of yttrium.

The composition of the invention additionally contains, as component (b), at least one dopant selected from among oxides and fluorides of main group and transition group elements. The dopants are preferably present in a proportion of in each case up to 5 mol %, particularly preferably in each case up to 2 mol %, even more preferably in each case up to 1 mol %, even more preferably 0.05-1 mol % and most preferably 0.1-0.2 mol %, based on the sum of the components (a) and (b).

A preferred dopant is a fluoride, which can be used, for example, as an alkaline earth metal fluoride or as an alkali metal fluoride, e.g. as potassium fluoride. The fluoride is preferably present in a proportion of 0.1-0.2 mol %, based on the sum of the components (a) and (b).

Further preferred dopants are alkaline earth metals and/or transition group elements which are present as cations bearing two or even more positive charges, preferably in the form of oxides and/or fluorides. Particularly preferred dopants are calcium, zinc and/or titanium, for example in the form of the oxides calcium oxide, zinc oxide or titanium dioxide. The cationic dopants are preferably present in a proportion of in each case 0.1-0.2 mol %, based on the sum of the components (a) and (b).

The luminescent compositions comprising the components (a) and (b) firstly have a high luminescence intensity and secondly have emission lines or peaks which are characteristic of the presence and proportions of the individual components. Thus, specific combinations of oxide sulfides and dopants make it possible to obtain a virtually unlimited number of different emission spectra which can be detected by means of a reading system matched specifically to the respective spectrum.

The compositions of the invention can be produced by homogenizing yttrium oxide ($Y_2O_3$) powder with oxides of the other elements, e.g. ytterbium oxide ($Yb_2O_3$), erbium oxide ($Er_2O_3$) and other oxides such as $Ho_2O_3$, $Lu_2O_3$ and/or $Gd_2O_3$, and also the dopants or precursors thereof, e.g. $TiO_2$, $CaCO_3$, ZnO and/or KF, by milling and subsequently sintering the mixture at elevated temperature, e.g. 1200-1700° C., in a furnace, preferably in air, in order to achieve homogeneous distribution of the cations in the crystal lattice. The sintered product is subsequently milled and reacted with $H_2S$ at temperatures in the range from 700° C. to 1000° C., preferably for 2-12 h, giving a uniform phase based on $Y_2O_2S$ and containing further oxide sulfides and also the dopants. The addition of fluoride as dopant leads to a homogeneous distribution of the lanthanide ions in the host lattice during the sintering process. The addition of dopants, e.g. polyvalent cations and/or fluoride, brings about drastic changes in the position and/or intensities of individual emission wavelengths. Furthermore, a large increase in the total luminescence intensity occurs. It is assumed that a three-photon absorption takes place in addition to the two-photon absorption known for anti-Stokes materials.

The luminophore of the invention can be used as detection and marking materials, for example as safety marking of materials or mixtures of materials. In this way, the authenticity of products or documents can be determined. The luminophor can, since it is chemically inert, be introduced into any solid and/or liquid materials or mixtures of materials or be applied thereto. For example, the luminophor can be applied to or introduced into carrier substances such as surface coating compositions, toners, inks, paints, etc, or products such as plastics, metals, glass, silicones, paper, rubber, etc. The luminophor is preferably added to the product or part of the product in an amount of 10-50 ppm, preferably 50-200 ppm. The luminophor of the invention is also suitable for use in biological systems, e.g. cell cultures, samples of body fluids or tissue sections or as contrast enhancer. Here, the luminophor in nanoparticulate or microparticulate forms can be coupled to biological detection reagents. Furthermore, the surfaces of particles of the luminophor can be modified by means of deodetomines or other bonding substances in order to improve the suspending properties, e.g. in organic liquids such as oils, naphthas, liquefied gases, etc., in aqueous liquids such as body fluids, in aqueous-organic liquid systems and flowable powders such as toners. The smaller the particles, the lower is the tendency for sedimentation to occur. The particle size can, for example, be reduced by intensive milling to such an extent, e.g. to ≥100 pm, that a stable suspension of the particles in liquids is achieved even without the addition of bonding substances.

Security against falsification of the marking is provided by the emission lines characteristic of the respective luminophor representing a cryptographic key which can be detected by a detector, i.e. the lock, matched to the respective material.

The detection of the presence of the luminophor can be effected by irradiation with a wavelength in the infrared range, in particular with IR monocoherent laser light or with an IR light-emitting diode having wavelengths in the range from about 850 to 1500 nm, preferably from about 920 to 1000 nm, particularly preferably about 950-1000 nm, most preferably from 920 to 985 nm, with the luminophor being excited and the emitted radiation in the range of wavelengths characteristic for the respective luminophor, for instance in the range from 300 to 1700 nm, being detected. Irradiation is preferably carried out at a power of 1-200 mW, in particular 10-80 mW. The irradiation of the product containing the luminophor can be carried out directly or by means of an optical waveguide or another optically relevant transfer medium, e.g. an optical solid body, a fluid, gas, etc. Detection can be effected visually or by means of detectors.

It is possible to use, for example, optical waveguides whose heads are ground as collecting lenses so that incident light (IR light) and light emitted by the luminophor (specific emission spectrum) form one unit and can be focused at the same point. An advantage is that no mechanical misalignment between receiver and transmitter can occur. The damping factor of the optical waveguide, e.g. of glass or plastic, can vary, with the transition from the optical components (radiation source or detection element) to the optical waveguide being constructed so as to be low in covision. The length of the optical waveguide can vary and is typically in the range from 1 cm to 50 cm.

In a particularly preferred embodiment, a luminophor having a characteristic emission spectrum is detected by means of a reading system matched to this emission spectrum. The reading system comprises a radiation source, preferably a radiation source in the IR range, and one or more optical detection elements which are provided for the selective detection of specific emission lines of the luminophor, e.g. in respect of the wavelength and/or intensity. The detection elements can be, for example, diodes, photoelements or electronic detectors. Preference is given to using detector matrices having a plurality of preferably differently set detectors, e.g. diode matrices, photoelement matrices or CCD matrices. The detectors or individual detectors of the detector matrix can be combined with optical filters, e.g. bandpass filters, which can also be vapor deposited on the detection element. The filters are preferably selected so that they allow passage of light in only a particular wavelength range, e.g. a range of 5-15 nm, preferably about 10 nm. The filters preferably contain high- and low-refraction layers such as $TiO_2$ and $SiO_2$. This ensures that bandpass filters having very small rise-fall flanks per optical element are provided. The passage of light which does not correspond to the wavelength characteristic of the luminophor is prevented.

The use of detectors or detector matrices which detect a plurality of emission lines of differing wavelength, e.g. 2, 3, 4 or more emission lines, which are characteristic of a particular luminophor makes it possible to provide a verification system having a high degree of security. The reading system may, if appropriate, also contain detectors which operate at wavelengths at which there is no emission line and thus serve as negative control.

The reading system can also, if appropriate, contain a programmable electronic unit which can be reprogrammed to other emission lines when required.

Furthermore, a plurality of different luminophors which can be evaluated either visually on the basis of different colors and/or by means of detectors can be applied to a product or a carrier. These different applications can be arranged beneath, above or next to one another, so that a complex and characteristic pattern is obtained. For example, when two different luminophors are applied next to one another on a product, irradiation with a suitable IR source results in emission of two different colors, giving a flip-flop effect.

The verification system according to the invention can also be combined with other verification systems, e.g. systems based on bacteriorhodopsin or specific DNA sequences.

Furthermore, the present invention is illustrated by the following example.

EXAMPLE 1

Production of a Luminophor

Pulverulent yttrium oxide was milled together with pulverulent oxides of ytterbium and erbium, in each case in proportions of 1-2 mol %, and other lanthanide oxides such as oxides of holmium, lutetium and/or gadolinium, in each case in proportions of 0.1-0.5 mol %, and also dopants $TiO_2$, $CaCO_3$, ZnO and/or KF, in each case in proportions of 0.1-0.2 mol %, in a ball mill for 3 hours. The resulting mixtures were sintered in air at 1500° C. in a furnace for 24-72 hours. The phase purity of the resulting sintered products was confirmed by X-ray diffraction. The sintered products were subsequently milled and the resulting powders were reacted with $H_2S$ at temperatures in the range from 800° C. to 900° C. for 2-12 hours. Phase-pure crystalline compounds of the $Y_2O_2S$ type were obtained, as was confirmed by X-ray diffraction.

BRIEF DESCRIPTION OF THE DRAWING

The drawing shows the X-ray powder diffraction measurement on a sample of the composition (Yb, Er, Lu, Y)$_2$O$_3$ in the ratio 1.0:1.0:0.5:97.5. The measurement was carried out using a Siemens D5000 diffractometer (copper K-alpha radiation). Only lattice reflections of the host lattice Y$_2$O$_2$S could be seen (formation of mixed crystals by substitution). Only a slight shift in the reflections caused by other ions incorporated into the host lattice can be observed. Since no further reflections are present, the material is a phase-pure crystalline product containing no further crystalline phases (secondary phases).

The invention claimed is:

1. A method for marking materials or mixtures of materials and detecting said marking, comprising applying at least one luminescent composition, wherein said at least one luminescent composition is made by
   (I) combining
      (a) an oxide of yttrium, and
      (b) further oxides of erbium, ytterbium and at least a third element selected from the group consisting of lanthanum, cerium, praseodymium, neodymium, samarium, europium, gadolinium, terbium, dysprosium, holmium, thulium and lutetium,
   (II) adding at least one dopant in an amount sufficient to bring about changes in the position and/or intensities of individual emission wavelengths, wherein said at least one dopant is selected from among oxides and fluorides of main group and transition group elements,
   (III) milling and sintering the resulting mixture at an elevated temperature sufficient to achieve homogeneous distribution of the cations in a crystal lattice to produce a sintered product,
   (IV) milling said sintered product and reacting with H$_2$S to obtain a phase pure crystalline state containing an oxide sulfide of yttrium, oxide sulfides of erbium, ytterbium and said at least a third element, and said at least one dopant,
      wherein the oxide sulfide of yttrium is present in an amount greater than 90 mol %, and said oxide sulfides of erbium and ytterbium are each 0.5-2 mol % based on the sum of components of said oxide sulfides of yttrium, erbium, ytterbium and at least a third element,
   and
      detecting said at least one luminescent composition which has said changes in the position and/or intensities of individual emission wavelengths due to said at least one dopant as compared to an emission spectrum for said at least one luminescent composition without said at least one dopant, by using a reading system that is adjusted to detect a specific emission spectrum of said at least one luminescent composition with changes in the position and/or intensities of individual emission wavelengths due to the at least one dopant, wherein said reading system selectively detects emission lines of the emission spectrum of said at least one luminescent composition.

2. The method according to claim 1, wherein a plurality of different ones of said luminescent composition are introduced as a mixture or as a pattern into the material or the mixture of materials or applied thereto.

3. The method according to claim 1, wherein the at least one luminescent composition is excited to luminescence by irradiation with a wavelength in the range of about 850-1500 nm, and the emitted radiation in a range of 300-1700 nm is detected.

4. The method according to claim 1, wherein said individual emission wavelengths are in the range of about 300-1700 nm.

5. The method according to claim 1, wherein said at least one dopant is selected from the group consisting of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, and mercury.

6. The method according to claim 1, wherein the oxide sulfide of said at least a third element is 0.1-1 mol % based on the sum of components (a) and (b).

* * * * *